United States Patent
Frankowsky (12)

(10) Patent No.: US 6,367,027 B1
(45) Date of Patent: Apr. 2, 2002

(54) SKEW POINTER GENERATION

(75) Inventor: Gerd Frankowsky, Höhenkirchen-Siegertsbrunn (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/273,842

(22) Filed: Mar. 22, 1999

(51) Int. Cl.[7] .............................................. G06F 13/00
(52) U.S. Cl. ...................................................... 713/600
(58) Field of Search ................................ 713/510, 503, 713/600; 710/68, 60; 711/167

(56) References Cited

U.S. PATENT DOCUMENTS

| | | | |
|---|---|---|---|
| 3,893,088 A | 7/1975 | Bell | 340/173 R |
| 4,014,550 A | 3/1977 | Wilcox | 273/153 R |
| 4,395,764 A | 7/1983 | Matsue | 365/78 |
| 5,689,689 A | * 11/1997 | Meyers et al. | 709/400 |
| 6,134,155 A | * 10/2000 | Wen | 709/189.04 |

FOREIGN PATENT DOCUMENTS

EP    0 286 356    10/1988

* cited by examiner

*Primary Examiner*—Thomas M. Heckler

(57) ABSTRACT

A pointer generation circuit, in accordance with the invention, includes a clock for providing a clock cycle, and a shift register with a plurality of latches for storing data bits. A first latch receives a flag bit upon a first clock cycle of the clock. A switch transfers the flag bit to the shift register on the first clock cycle. The switch connects a last latch to the first latch after the flag bit is transferred to the shift register. The flag bit is transferred to a next latch, wherein the next latch for the last latch is the first latch, at each consecutive clock cycle thereby generating pointer signals in accordance with the clock cycle and the data bits stored in the latches.

19 Claims, 7 Drawing Sheets

SKEW POINTER GENERATION

BACKGROUND

1. Technical Field

This disclosure relates to data transfer devices and more particularly, to a data transfer device which reduces delay between output data and a clock cycle.

2. Description of the Related Art

In digital devices, such as memory devices, data transfer to and from first in/first out devices (FIFOs) is controlled using input/output pointers. FIFOs are memory devices which output data in the same order as entered at the input. A relationship between the pointers which control the FIFO and a clock need to be well defined. It is particularly desirable for high frequency designs to maintain a substantially constant delay between the pointers and the clock.

Referring to FIG. 1, a conventional 1 out-of-8 decoder 10 is shown. Using binary counters for input and/or output pointer generation employs decoder 10 to output a bit representing a number input from binary counters. To decode a "0" inputs are Q0=0, Q1=0 and Q2=0. The pointer output for a FIFO-latch <0> is "0" all others are one. Decoder must invert all "0"s to "1"s and NAND them using invertors 12 and NAND gate 14, respectively to output decoder FIFO latch <0>. For decoding a "7" the binary counter signals to decoder are Q0=1, Q1=1 and Q2 =1. The pointer output for a FIFO-latch <7> is "0" all others are one. Decoder uses all "1"s without using invertors. NAND gate 16, NANDs the inputs at decoder for FIFO latch <7> to provide an output of "1". Other pointers for FIFO latches <1> to <6>, have different inverter combinations in decoder to decode the binary counter inputs. timing diagram shows a clock pulse (CLK) as compared to the pointers for FIFO latches <0> and <7>. The decoding of a "0" includes invertors 12 which introduce additional delay between the pointer from FIFO latch <0> and CLK. The delay is represented by td+δ. The decoding of a "7" does not include invertors. The delay is represented by td. The additional delay of δ is typically in the order of hundreds of pico seconds. This uncertainty in the pointer signals with respect to CLK is not desired.

Referring to FIG. 3, another timing diagram is shown for a prior art FIFO illustratively depicts a clock signal CLK and pointer signals PTR <0>, PTR <1>, and PTR <7>. Pointer signals each have a delay δ ciated therewith and indicated in the timing diagram. As is apparent from FIG. 3, $\delta_0 \neq \delta_1 \neq \ldots \delta_7$. This inequality between delay leads to differences in time for data output Dout as indicated by $\tau_0$, $\tau_1$ and $\tau_7$. $\tau_0 \neq \tau_1 \neq \ldots \neq \tau_7$ which results in a skew problem.

Therefore, a need exists for pointer generation which includes pointers having a substantially same delay with respect to a clock. A further need exists for a method of providing FIFO memory with pointers with the substantially same delay with respect to the clock.

SUMMARY OF THE INVENTION

A pointer generation circuit, in accordance with the invention, includes a clock for providing a clock cycle, and a shift register with a plurality of latches for storing data bits. A first latch receives a flag bit upon a first clock cycle of the clock. A switch transfers the flag bit to the shift register on the first clock cycle. The switch connects a last latch to the first latch after the flag bit is transferred to the shift register. The flag bit is transferred to a next latch, wherein the next latch for the last latch is the first latch, at each consecutive clock cycle thereby generating pointer signals in accordance with the clock cycle and the data bits stored in the latches. The flag bit is transferred to a next latch, wherein the next latch for the last latch is the first latch, at each consecutive clock cycle thereby generating pointer signals in accordance with the clock cycle and the data bits stored in the latches.

Another pointer generation circuit in accordance with the invention includes a clock for providing a clock cycle. A shift register includes a plurality of latches for storing data bits. A first latch receives a flag bit upon a first clock cycle of the clock. A switch transfers the flag bit to the shift register on the first clock cycle. The switch connects a last latch to the first latch after the flag bit is transferred to the shift register. The flag bit being transferred to a next latch, wherein the next latch for the last latch is the first latch, at each consecutive clock cycle thereby generating output signals in accordance with the clock cycle and the data bits stored in the latches. A pulse generation circuit is included for receiving the output signals and generating a pointer signal having a predetermined pulse width.

In alternate embodiments, the flag bit is preferably a digital "1" and the latches other than the latch including the flag bit are digital"0"s. The shift register may include eight latches. The latches of the shift register may output to a first in/first out (FIFO) memory device. Each clock cycle may include a first signal edge and the latches preferably output a pointer signal such that a time delay for the pointer signal from each latch is substantially equal relative to the first signal edge of a corresponding clock cycle. The circuit may be included on an integrated circuit chip.

A method for pointer generation for first in/first out memories includes the steps of providing a pointer generation circuit including a clock for providing a clock cycle, a shift register including a plurality of latches for storing data bits, a first latch for receiving a flag bit upon a first clock cycle of the clock, initializing the latches to a data bit value, transferring the flag bit to the first latch, connecting the last latch to the first latch, transferring the flag bit to a next latch, wherein the next latch for the last latch is the first latch, corresponding to each clock cycle and generating pointer signals in accordance with the clock cycle by outputting the data bits stored in the latches.

In other methods, the flag bit is preferably a digital "1" and the data bit value is a digital "0". The shift register may include eight latches. The step of generating pointer signals may include the step of generating pointer signals in accordance with the clock cycle by outputting the data bits stored in the latches to a pulse generating circuit. The method may further include the step of generating pulses of a predetermined pulse width by the pulse generating circuit. Each clock cycle may include a first signal edge, and the method may further include the step of outputting a pointer signal from the latches such that a time delay for the pointer signal from each latch is substantially equal relative to the first signal edge of a corresponding clock cycle. The pointer generation circuit preferably includes a switch and the method may further include the steps of transferring the flag bit to the shift register on the first clock cycle through the switch, connecting a last latch to the first latch through the switch after the flag bit is transferred to the shift register.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

This disclosure relates to data transfer devices and more particularly, to a data transfer device which provides a uniform delay between output data pointers and a clock cycle. The present invention employs a shift register to generate pointers. Alternately, the present invention employs a pulse generator circuit which generates pointers in accordance with the shift register output. The pulse generator provides pulses of a predetermined width. The present invention advantageously employs the shift register to provide a more uniform delay between each pointer with respect to a clock. The present invention does not need a binary counter or a decoder as implemented in conventional systems; instead the binary counter and decoder are replaced by the shift register which functions as a circular shift register to timely generate pointer signals to be output to a FIFO memory device. Time delays between the clock cycle for shifting the shift register are substantially equal for each individual pointer signal.

Figure 2:
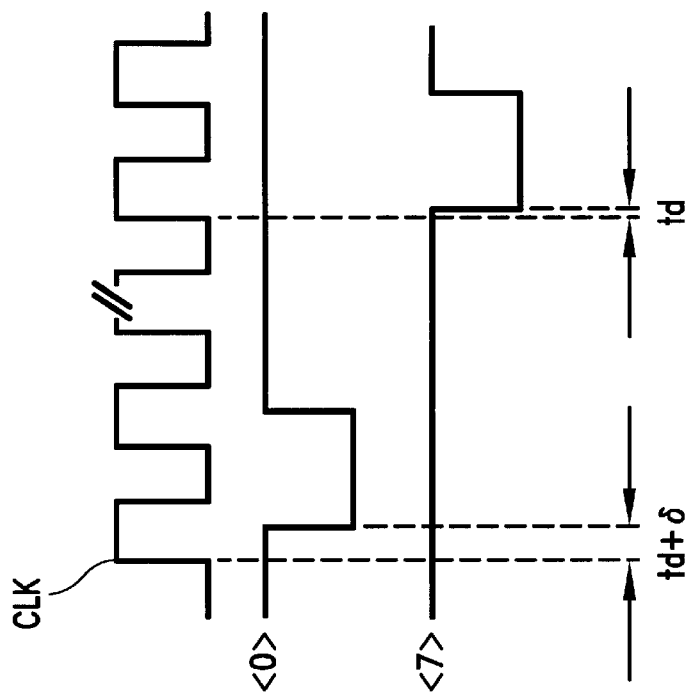
FIG. 2 is a timing diagram for the pointer generating circuit of FIG. 1, showing different delays for different pointers with respect to a common clock in accordance with the prior
Figure 1:
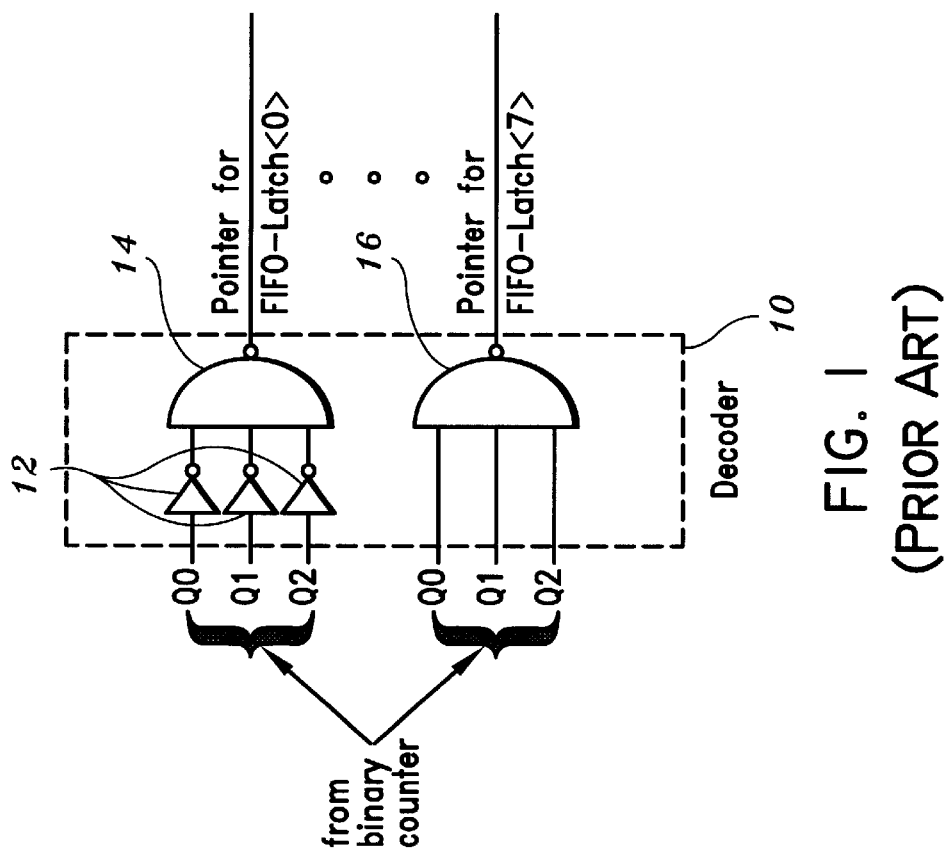
FIG. 1 is a schematic diagram of a pointer generation circuit showing a conventional decoder circuit and a binary counter for generating pointers for first in/first out memory devices.
Figure 3:
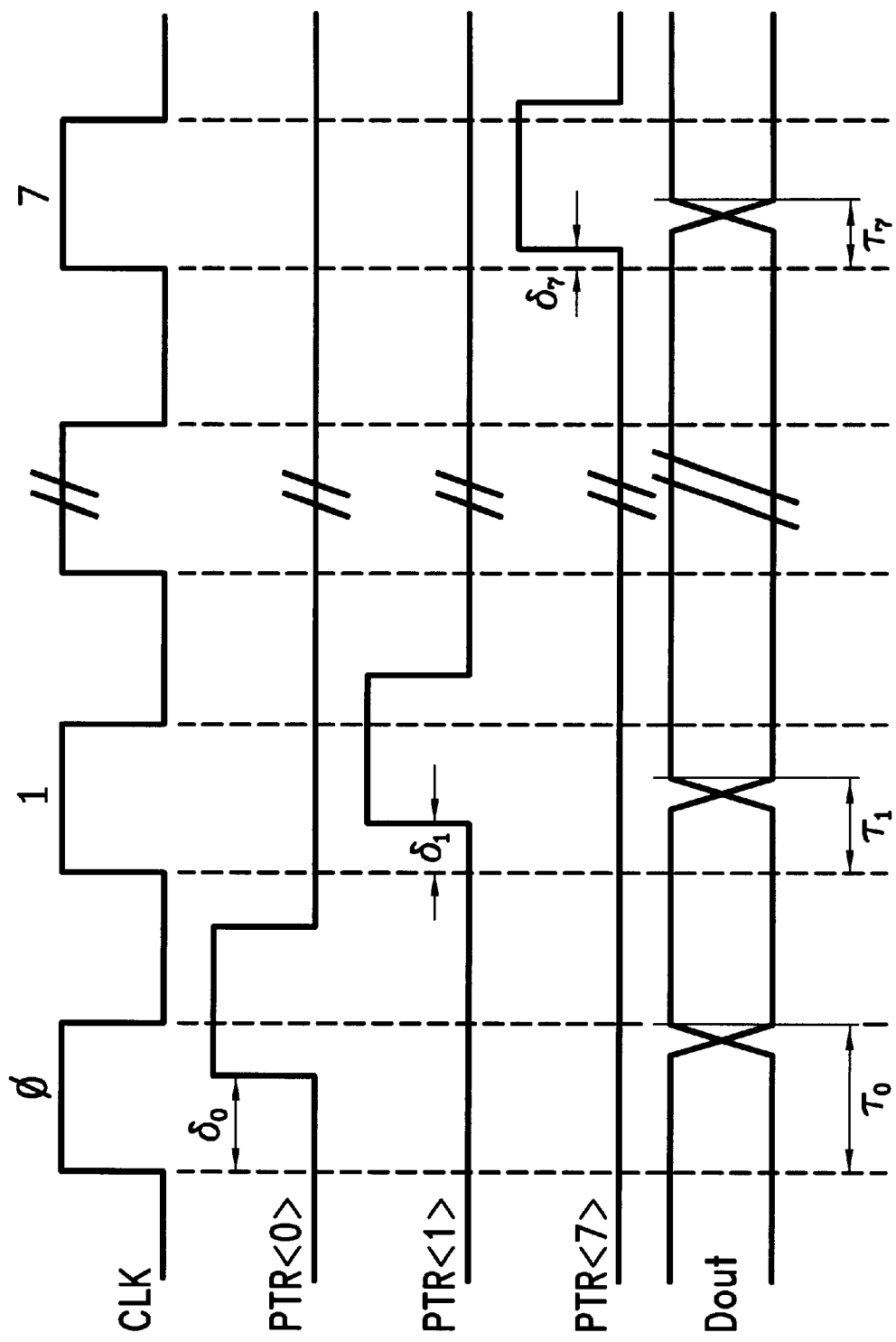
FIG. 3 is a timing diagram for pointer generation in accordance with the prior art.
Figure 4:
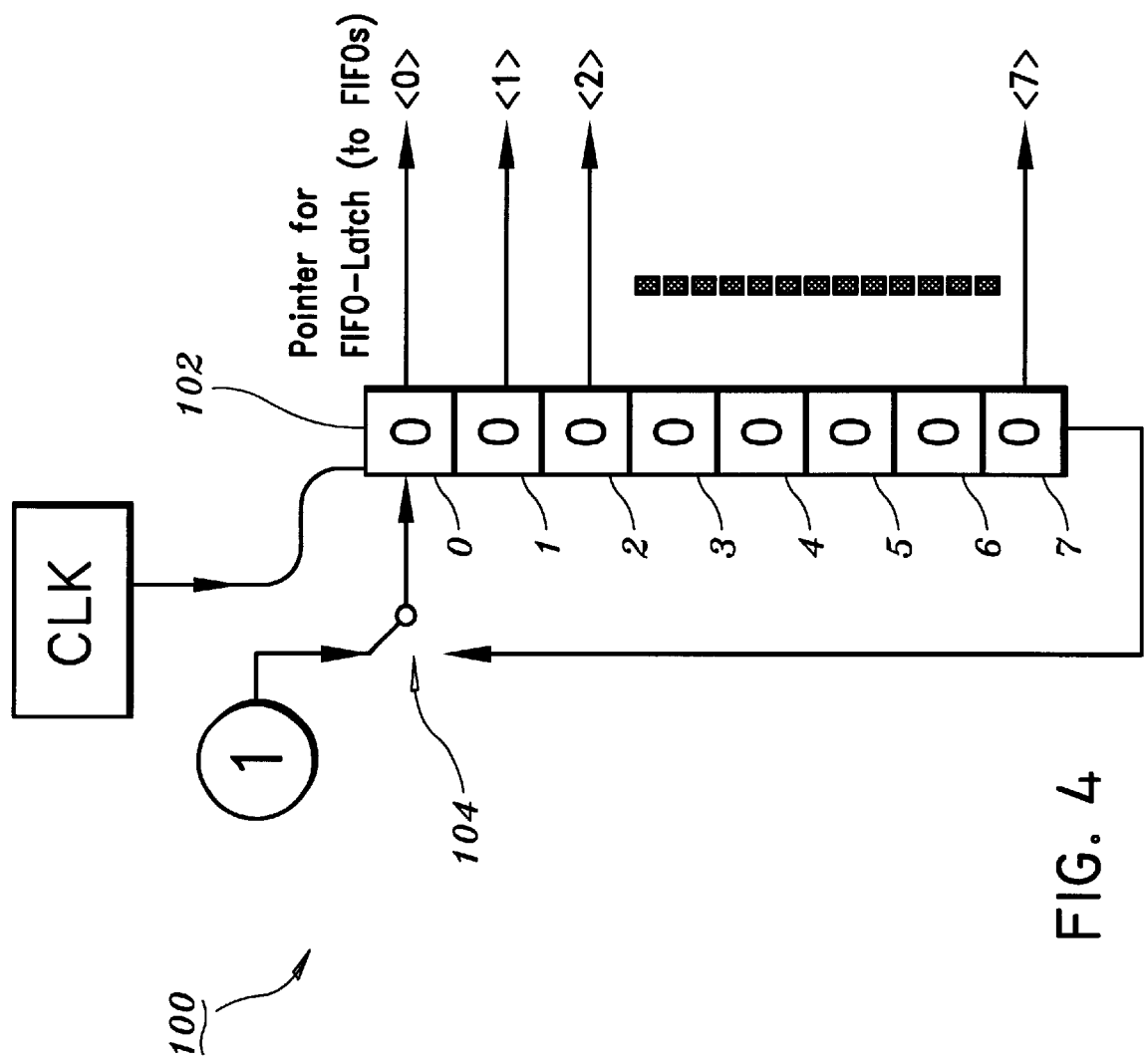
FIG. 4 is a schematic diagram of a pointer generation circuit showing a shift register and switch for generating pointers preferably for first in/first out memory devices in accordance with the present invention.

Referring now in specific detail to the drawings in which like reference numerals identify similar or identical elements throughout the several views, and initially to FIG. 4, an improved skew circuit 100 is shown in accordance with the present invention. Circuit 100 may be formed and implemented on an integrated circuit chip, such as a memory chip. Circuit 100 advantageously includes a shift register 102 having N latches. For simplicity, shift register 102 will be illustratively described having 8 latches (0–7); however, a greater or lesser number of latches may be employed in accordance with the invention. Shift register 102 replaces both a binary counter and a decoder which are typically employed in conventional systems. The present invention is also illustratively described in terms of digital ones and zeros. Other techniques may be included by employing other states as known by those skilled in the art.

Figure 5:
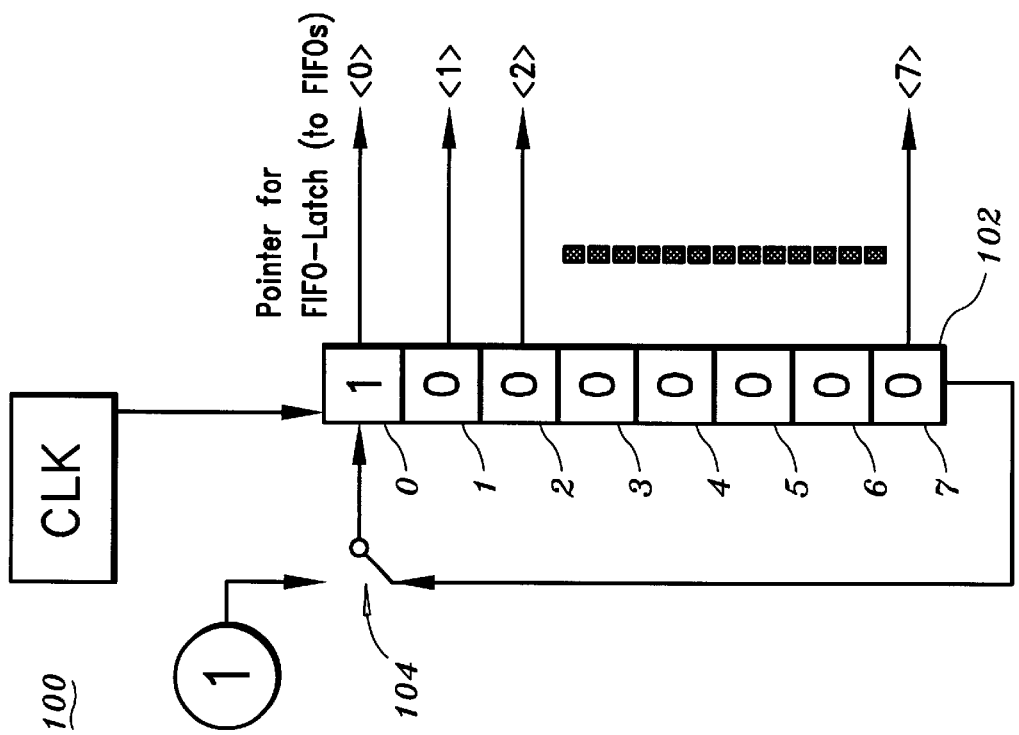
FIG. 5 is a schematic diagram of the pointer generation circuit of FIG. 4 showing the shift register having a flag data bit transferred thereto and the switch open for additional flag bits but closed to permit an output of the last latch to be connected to the input of the first latch in accordance with the present invention.

Shift register 102 is initialized so that all latches (0–7) are set to "0" (or "1"). With a first clock pulse from CLK, a "1" is transferred to a latch 0. After the "1" is transferred to shift register 102, a switch 104 is closed to connect an output of a latch 7 to the input of latch 0 as shown in FIG. 5. In this way, shift register 102 functions as a circular register which includes a single "1" (or "0"). A next clock pulse moves the "1" from latch 0 to a latch 1. When the "1" is provided in a given latch of shift register 102, a corresponding pointer signal is generated, for example <0> is "1" when the "1" is present in latch 0 and "0" otherwise. The "1" moves through the latches and is returned to latch 0 from latch 7 each time the "1" is moved through the latches of shift register 102. In another embodiment, latch 7 need not be connected to latch 0; instead a new "1" (or "0") may be introduced to latch 0 every eighth clock cycle. The previously introduced "1" (or "0") is simply discarded from latch 7.

Figure 6:
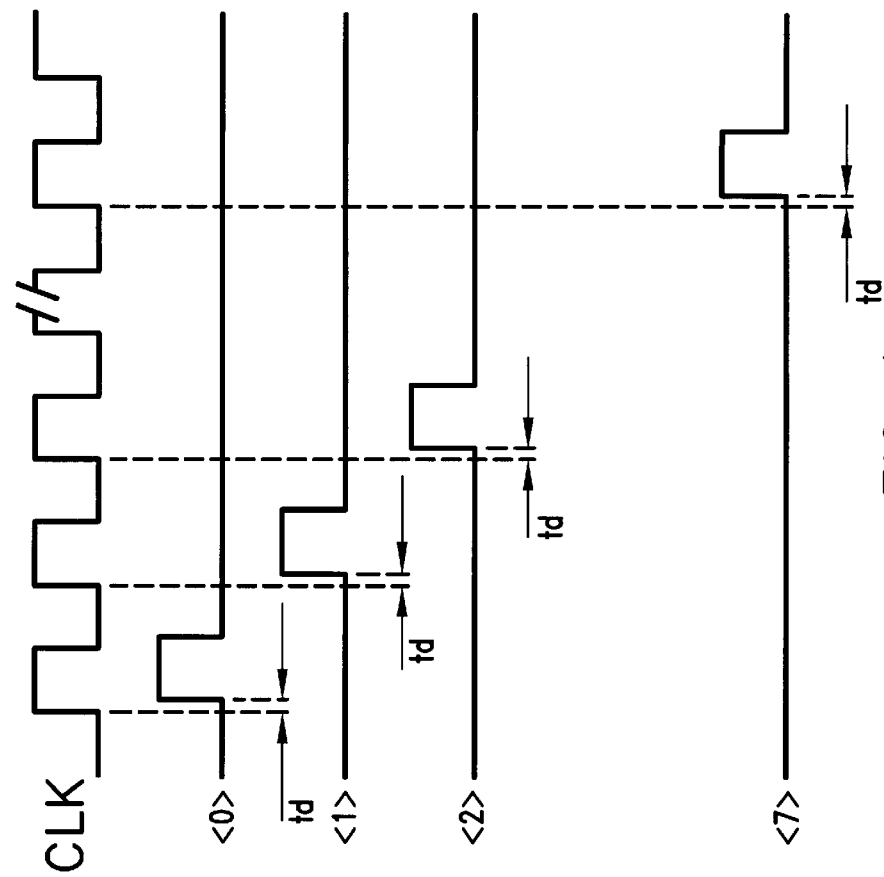
FIG. 6 is a timing diagram for the pointer generating circuit of FIGS. 4 and 5, showing substantially the delays for different pointers with respect to a common clock in accordance with the present invention.

Referring to FIGS. 5 and 6, a circuit and timing diagram is shown for pointer generation relative to a clock CLK. By providing shift register 102, the "1" is passed through each latch (0–7), one latch at a time where the transfer of the "1" is performed after each clock cycle. In this way, substantially the same time delay td is experienced between the pointer signals <0>–<7> and the clock signal (CLK).

Figure 7:
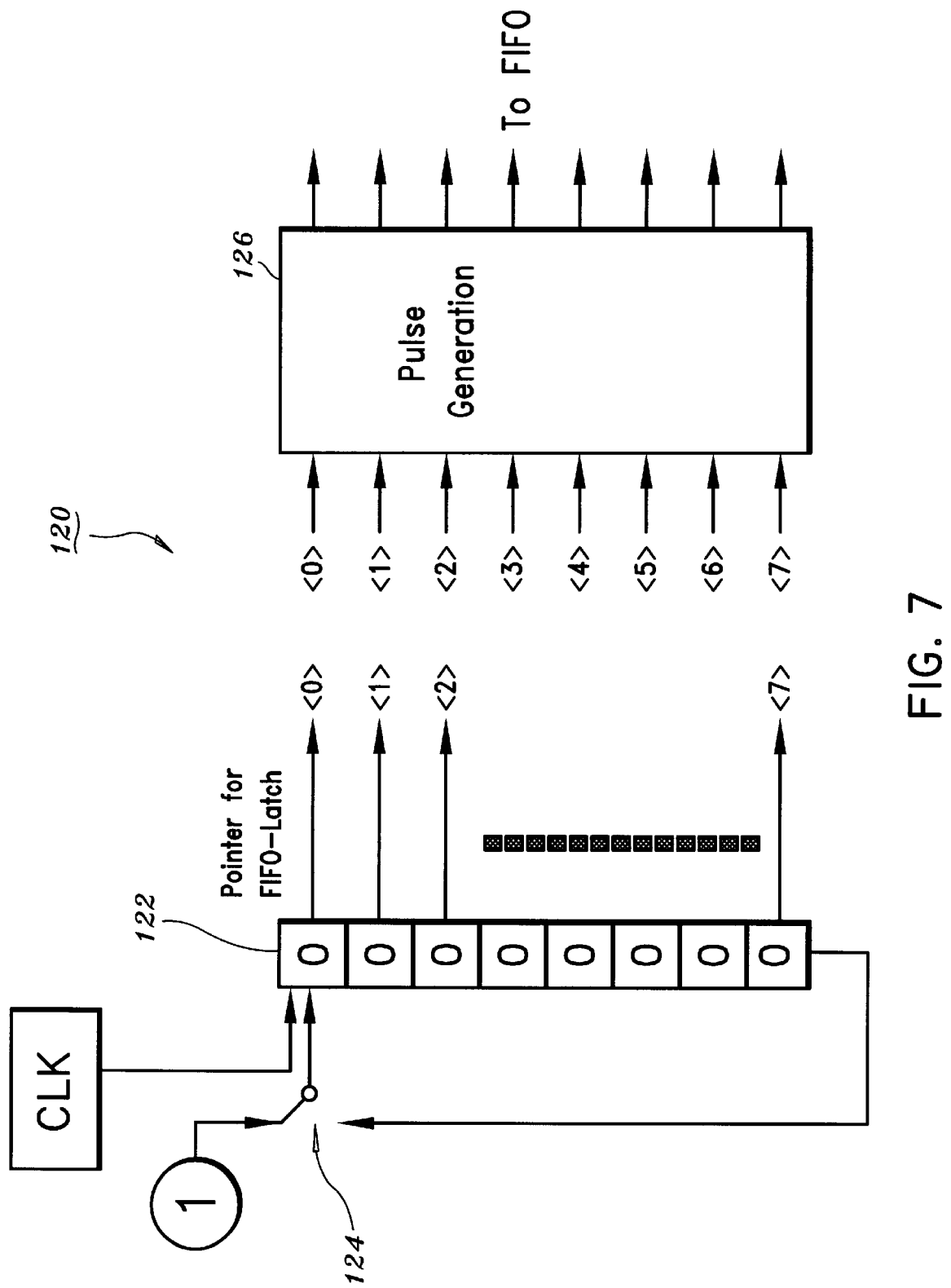
FIG. 7 is a schematic diagram of the pointer generation circuit of FIG. 4 showing the shin register outputting to a pulse generation circuit for setting pointer pulses to a predetermined pulse width in accordance with the present invention.

Referring to FIG. 7, another embodiment of the present invention is shown. A circuit 120 includes a shift register 122 having latches 0–7. A switch 124 is included which functions the same as switch 104 of FIG. 5. A pulse generation circuit 126 is provided for receiving pointers <0>–<7> generated by shift register 122. Pulse generation circuit 126 is triggered by the pointers output from latches 0–7 of shift register 122. Pulse generation circuit 126 may provide pulses having predetermined pulse widths to FIFOs. In this way, specific pulses may be provided as needed.

Figure 8:
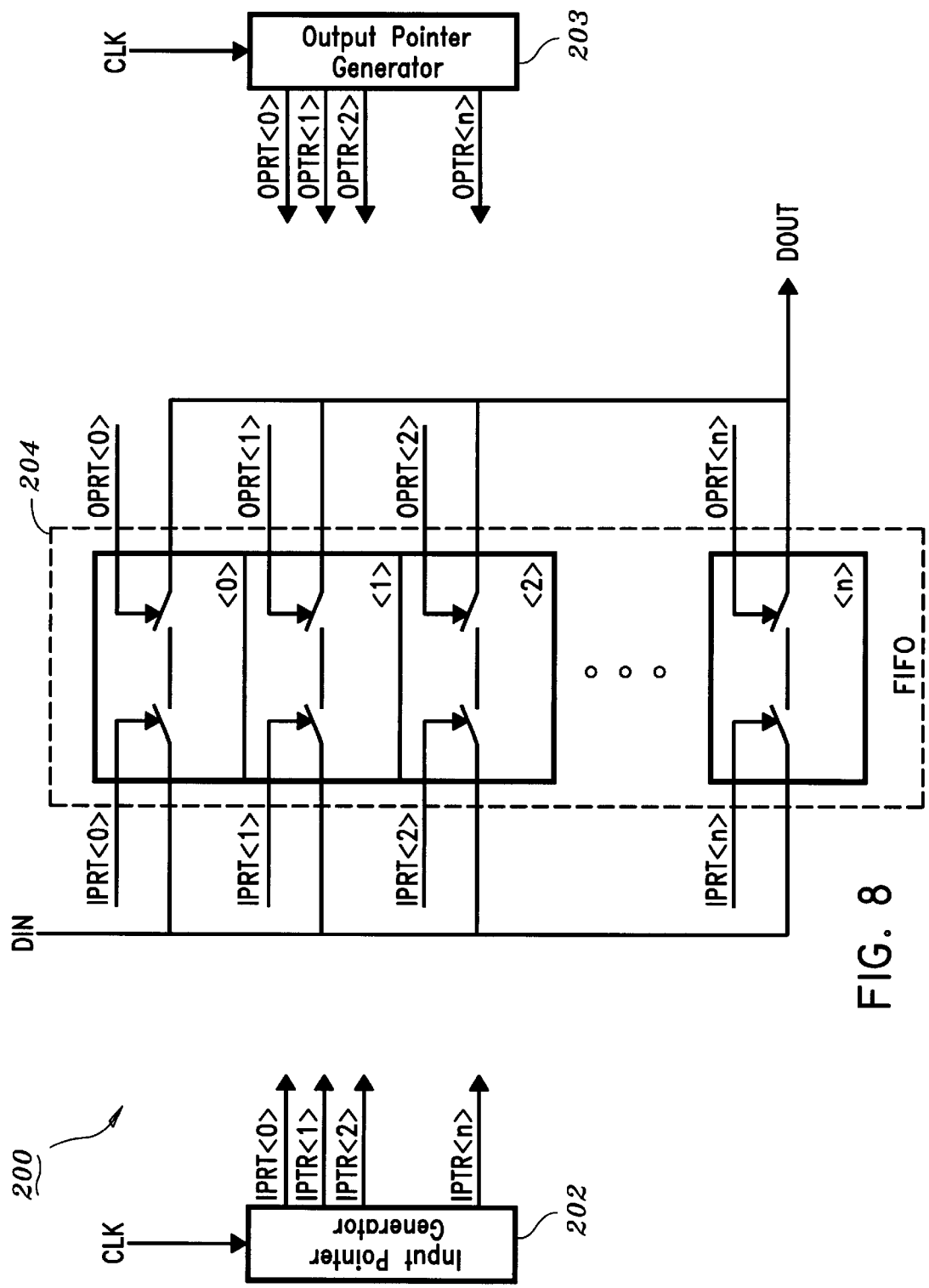
FIG. 8 is a schematic diagram of another pointer generation and FIFO circuit in accordance with the present invention.
Figure 9:
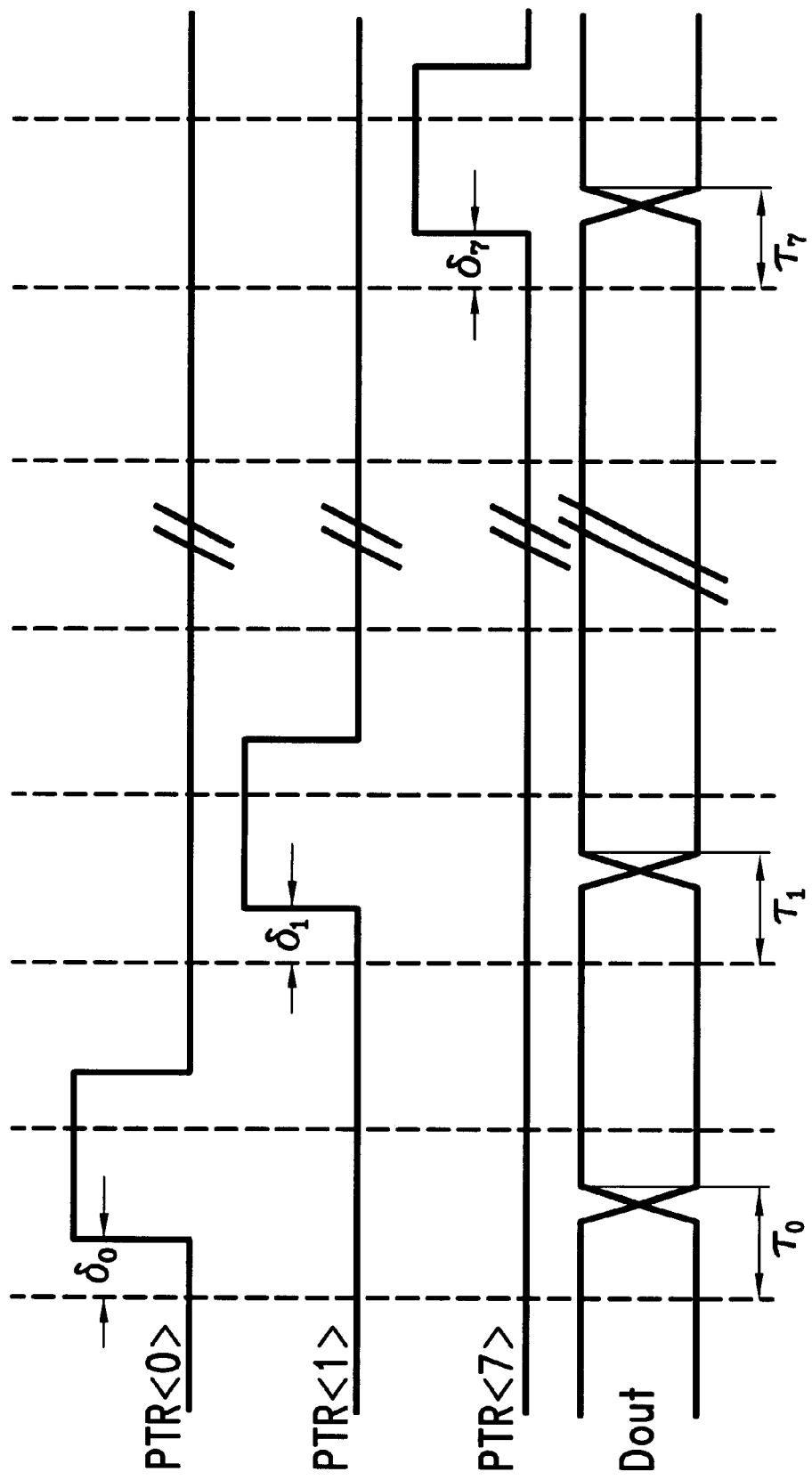
FIG. 9 is a timing diagram for pointer generation of FIG. 8 in accordance with the present invention.

Referring now to FIG. 8, an improved skew circuit 200 is shown in accordance with the present invention. Circuit 200 may be formed and implemented on an integrated circuit chip, such as a memory chip. Circuit 200 advantageously includes input/output generators 202 and 203 each including a shift register providing n pointer signals in accordance with the invention. A described above, pointer generators 202 and 203 generate pointer signals IPTR <0:n> and OIPTR <0:n> which are synchronized by a clock CLK input in accordance with the present invention. Input and output PTRs control latches <0:n> of FIFO circuit 204. Advantageously, data Referring to FIG. 9, a timing diagram for circuit 200 is shown which illustratively depicts a clock signal CLK and pointer signals PTR <0>, PTR <1>, and PTR <7>. Pointer signals each have a delay δ associated therewith and indicated in the timing diagram. As is apparent from FIG. 9, $\delta_0 = \delta_1 = \ldots = \delta_7$. This equality between delay leads to substantially equal delays for data output Dout as indicated by $\tau_0, \tau_1$ and $\tau_7$. $\tau_0 = \tau_1 = \ldots = \tau_7$ which results in significantly reduced skew in accordance with the present invention.

Having described preferred embodiments for improved skew pointer generation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A pointer generation circuit for generating pointers for controlling a first in/first out circuit comprising:

a clock for providing a clock cycle;

a shift register including a plurality of latches for storing data bits, a first latch receiving a flag bit upon a first clock cycle of the clock;

a switch for transferring the flag bit to the shift register on the first clock cycle, the switch connecting a last latch to the first latch after the flag bit is transferred to the shift register; and the flag bit being transferred to a next latch, wherein the next latch for the last latch is the first latch, at each consecutive clock cycle thereby generating pointer signals in accordance with the clock cycle and the data bits stored in the latches.

2. The circuit as recited in claim 1, wherein the flag bit is a bit having a first polarity and the latches other than the latch including the flag bit include bits having a second polarity.

3. The circuit as recited in claim 1, wherein the shift register includes eight latches.

4. The circuit as recited in claim 1, wherein the latches of the shift register output to a first in/first out memory device.

5. The circuit as recited in claim 1, wherein each clock cycle includes a first signal edge and the latches output a pointer signal such that a time delay for the pointer signal from each latch is substantially equal relative to the first signal edge of a corresponding clock cycle.

6. The circuit as recited in claim 1, wherein the circuit is included on an integrated circuit chip.

7. A pointer generation circuit for memory devices for generating pointers for controlling a first in/first out circuit comprising:

a clock for providing a clock cycle;

a shift register including a plurality of latches for storing data bits, a first latch receiving a flag bit upon a first clock cycle of the clock;

a switch for transferring the flag bit to the shift register on the first clock cycle, the switch connecting a last latch to the first latch after the flag bit is transferred to the shift register;

the flag bit being transferred to a next latch, wherein the next latch for the last latch is the first latch, at each consecutive clock cycle thereby generating output signals in accordance with the clock cycle and the data bits stored in the latches; and a pulse generation circuit for receiving the output signals and generating a pointer signal having a predetermined pulse width.

8. The circuit as recited in claim 7, wherein the flag bit is a bit having a first polarity and the latches other than the latch including the flag bit include bits having a second polarity.

9. The circuit as recited in claim 7, wherein the shift register includes eight latches.

10. The circuit as recited in claim 7, wherein the latches of the shift register output to a first in/first out memory device.

11. The circuit as recited in claim 7, wherein each clock cycle includes a first signal edge and the latches output a pointer signal such that a time delay for the pointer signal from each latch is substantially equal relative to the first signal edge of a corresponding clock cycle.

12. The circuit as recited in claim 7, wherein the circuit is included on an integrated circuit chip.

13. A method for pointer generation for first in/first out memories comprising the steps of:

providing a pointer generation circuit including a clock for providing a clock cycle, a shift register including a plurality of latches for storing data bits, a first latch for receiving a flag bit upon a first clock cycle of the clock;

initializing the latches to a data bit value;

transferring the flag bit to the first latch;

connecting the last latch to the first latch;

transferring the flag bit to a next latch, wherein the next latch for the last latch is the first latch, corresponding to each clock cycle; and generating pointer signals in accordance with the clock cycle by outputting the data bits stored in the latches.

14. The method as recited in claim 13, wherein the flag bit is a first polarity and the data bit value is a second polarity.

15. The method as recited in claim 13, wherein the shift register includes eight latches.

16. The method as recited in claim 13, wherein the step of generating pointer signals includes the step of generating pointer signals in accordance with the clock cycle by outputting the data bits stored in the latches to a pulse generating circuit.

17. The method as recited in claim 16, further comprises the step of generating pulses of a predetermined pulse width by the pulse generating circuit.

18. The method as recited in claim 13, wherein each clock cycle includes a first signal edge and the method further comprises the step of outputting a pointer signal from the latches such that a time delay for the pointer signal from each latch is substantially equal relative to the first signal edge of a corresponding clock cycle.

19. The method as recited in claim 13, wherein the pointer generation circuit includes a switch and the method further comprises the steps of:

transferring the flag bit to the shift register on the first clock cycle through the switch;

connecting a last latch to the first latch through the switch after the flag bit is transferred to the shift register.

* * * * *